United States Patent [19]
Fischer

[11] Patent Number: 4,496,161
[45] Date of Patent: Jan. 29, 1985

[54] RADIALLY EXTENSIBLE JOINT PACKING WITH O-RING

[75] Inventor: Richard J. Fischer, Aurora, Colo.

[73] Assignee: The Gates Rubber Company, Denver, Colo.

[21] Appl. No.: 436,241

[22] Filed: Oct. 25, 1982

[51] Int. Cl.³ .......................... F16J 15/10; F16J 15/56
[52] U.S. Cl. ............................................ 277/1; 277/30; 277/165; 277/177; 277/188 A; 277/198
[58] Field of Search ................. 277/30, 147, 165, 177, 277/180, 186, 188 R, 188 A, 198, 214, 228, 1, DIG. 6

[56] References Cited

U.S. PATENT DOCUMENTS

| | | | |
|---|---|---|---|
| 2,437,586 | 3/1948 | Aber | 277/177 X |
| 2,647,810 | 8/1953 | McCuistion | 277/177 |
| 3,079,205 | 2/1963 | Hugley | 277/179 X |
| 3,166,832 | 1/1965 | Scannell | 277/188 A X |
| 3,316,971 | 5/1967 | Brown | 277/30 X |
| 3,331,609 | 7/1967 | Moran | 277/165 X |
| 4,179,131 | 12/1979 | Nussbaumer | 277/165 |
| 4,190,258 | 2/1980 | Arai et al. | 277/165 X |

FOREIGN PATENT DOCUMENTS 960401 3/1957 Fed. Rep. of Germany ...... 277/198

*Primary Examiner*—Robert S. Ward
*Attorney, Agent, or Firm*—H. W. Oberg, Jr.; C. H. Castleman, Jr.

[57] ABSTRACT

An O-ring assembly with a generally piston-like shape elastomeric body that is radially extensible and has a circumferential groove which retains a circumferentially extensible O-ring.

7 Claims, 8 Drawing Figures

RADIALLY EXTENSIBLE JOINT PACKING WITH O-RING

BACKGROUND OF THE INVENTION

The invention relates to joint packings, but more particularly, the invention relates to a packing with an elastomeric O-ring that is used to effect a high pressure seal between a cylindrical type bore and a piston-like member.

O-Ring type packings 10 provide an excellent and reliable high pressure and temperature seal between a smooth cylindrical bore 12 and a piston like member 13 fitted with an "O-ring" 14 as shown in FIG. 1. A preferred clearance between the piston member and cylindrical bore is always several times less than a chosen O-ring cross-sectional diameter 16. Publications are replete with recommended sizes of O-rings for various cylinder and piston diameters and applications. For example, a radial clearance of about 0.003 inch between a piston and bore is recommended for a 90 durometer O-ring to seal at 6000 psi. A recommended O-ring for a 4.5 inch diameter piston has a cross-sectional diameter of 0.210 inch. For such an application the O-ring cross-sectional diameter is 6 times greater than the recommended clearance. In high pressure applications, back up rings 18 may be used on either side of an O-ring to provide support. In any case, O-rings cannot be used as an effective sealing mechanism where there is radial clearance between an O-ring and a cylindrical bore because some O-ring precompression is required.

SUMMARY OF THE INVENTION

In accordance with the invention, an O-ring assembly is provided that has a piston type elastomeric body that is radially extensible. The body is generally circular when viewed in axial cross section. An O-ring is positioned in a circumferential groove formed in the body. The groove is circumferentially extensible with the body as the body radially extends. Optionally, the body is radially extensible when externally clamped along a longitudinal axis of the body. A stop means may optionally be included in the body to limit an axial clamping distance. Together, the radially extensible body with O-ring define a piston type member that may be used in conjunction with a cylindrical type bore to effect a high pressure sealing mechanism where the normal radial clearance between the body and cylindrical bore may be greater than a cross-sectional diameter of the O-ring.

An advantage of the invention is that the elastomeric body has the capability of supporting its filled O-ring to form an effective seal with cylindrical type members of various diameters.

Another advantage of the invention is that a large radial clearance between a cylinder and a piston member may be required to accommodate positioning the piston member with the cylindrical member.

Other features of the invention will be apparent after reviewing the figures and description thereof wherein.

Figure 7:
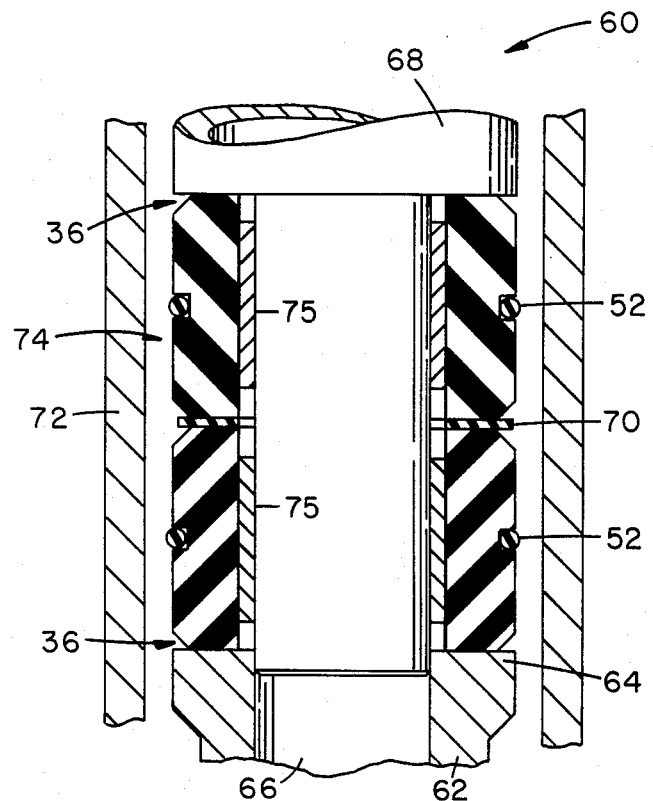
Figure 8:
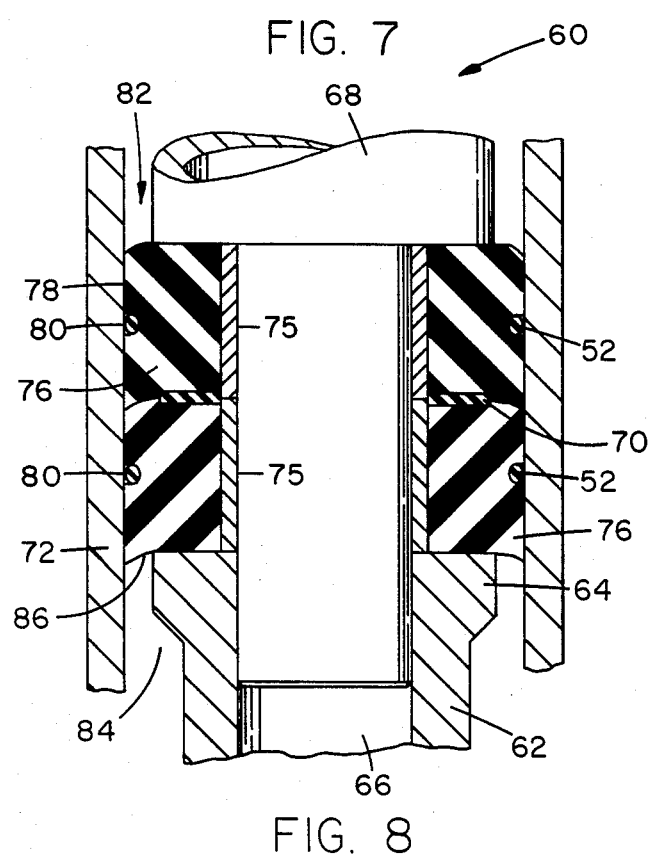

FIG. 7 is a partial diametrical cross section showing the use of two elastomeric core joint packings incorporating features of the invention as part of a tool positioned in a casing; and FIG. 8 is a view similar to FIG. 7 but showing the tool externally clamping the elastomeric core causing it and the O-ring to radially extend and seal against the casing as differential pressure is applied across the core.

DESCRIPTION OF PREFERRED EMBODIMENTS

Figure 2:
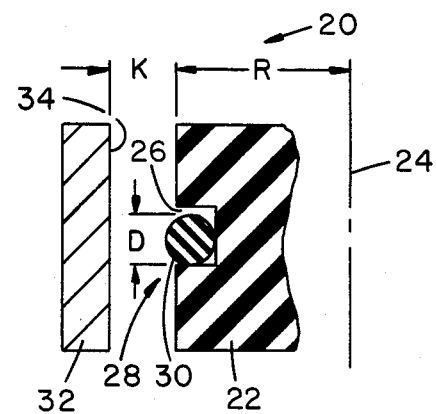
FIG. 2 is a view similar to that of FIG. 1 but showing a radially extendable elastomeric body and O-ring of the invention.

Referring to FIG. 2, an O-ring assembly 20 of the invention is shown. The assembly has a generally piston-like elastomeric body 22 having a longitudinal axis 24. The body may be made from any of the suitable elastomers such as natural rubber, synthetic rubber, or blends thereof, and polyurethane. The type of elastomer is chosen for its intended use such as for being chemically resistant to chemicals such as oils, acid, alkalines, etc. The body is made of an elastomer so that it is radially extensible relative to its longitudinal axis. Any desired means such as a mechanical means, hydraulic means, or pneumatic means may be used to radially extend the elastomeric body as will later be discussed with regard to an exemplary article of manufacture. An O-ring receiving circumferential groove 26 is formed in a surface portion 28 of the body and an elastomeric O-ring 30 is disposed in the groove. The body has a compression modulus that is higher than the compression modulus of the O-ring so that the body can support the O-ring when effecting a seal.

Figure 1:
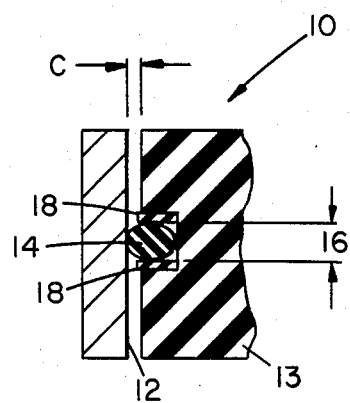
FIG. 1 is a partial radial cross-sectional view of a prior art piston type member fitted with an O-ring positioned for sealing engagement with a cylindrical type bore.

The O-ring assembly 20 is positioned into a member 32 having a cylindrical-type bore 34. Although not required as a part of this invention, a radial clearance K between the body 22 and bore 34 may be greater than a diameter D of the O-ring. However, a feature of the invention is that the clearance need not be several times less than the O-ring cross-sectional diameter. The O-ring assembly is also operative at various bore radii R where the radial clearance K is larger or smaller than shown in FIG. 2 such as equal to the clearance C as illustrated in FIG. 1.

Figure 3:
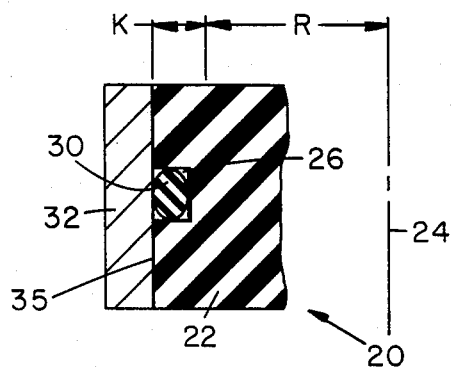
FIG. 3 is a view similar to that of FIG. 2 but showing the elastomeric body extended and engaging a cylindrical bore while supporting the O-ring for effecting a seal.

Referring to FIG. 3, the radially extensible elastomeric body 22 is radially extended an amount equal to the original radius R plus clearance K by some force means, not shown. The O-ring receiving groove 26 is circumferentially extensible as part of the body and defines a means for supporting the O-ring 30 at various diameters. When extended, the elastomeric body also may contact a portion 35 of the cylindrical bore to the extent that there is a zero clearance between the body and bore. The effect is to support the O-ring for good sealing engagement without the requirement of additional support washers. The body is capable of supporting the O-ring to seal against rough surfaces (e.g., having a surface finish of 125 to 250 micro-inch such as exists in pipe casings.

To be effective, the O-ring is made of an elastomeric material so that it is circumferentially extensible when radially extended at the O-ring receiving groove. Like the elastomeric body, the O-ring is made of any suitable elastomeric material that is compatible with its intended use.

Figure 4:
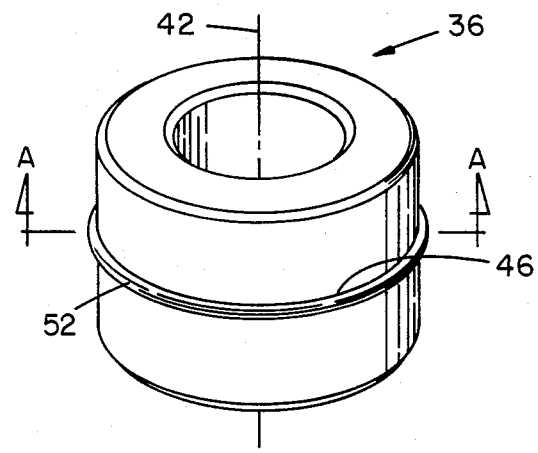
FIG. 4 shows an isometric view of the O-ring assembly of the invention as applied to an article of manufacture as a joint packing of the type of a generally annularly-shaped elastomeric core that is radially extensible when externally clamped along a longitudinal axis of the core.
Figure 5:
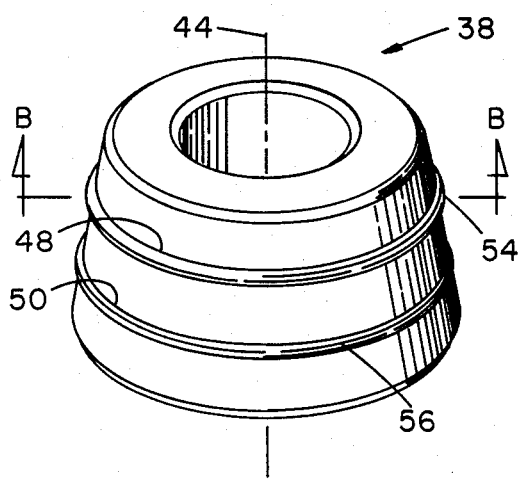
FIG. 5 is a view similar to FIG. 4 but showing a joint packing of the frustoconical type having two O-ring assemblies of the invention.
Figure 6:
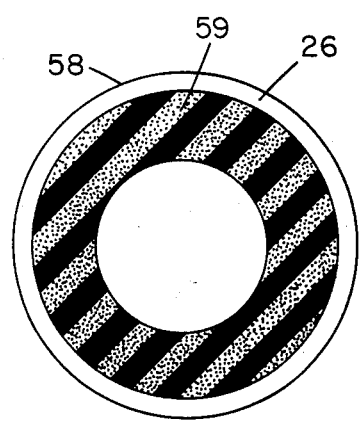
FIG. 6 is a view either taken along the line A—A of FIG. 4 or B—B of FIG. 5 showing an exterior surface portion that is substantially circular when viewed in axial cross section.

FIGS. 4-6 illustrate the features of the invention as an embodiment of joint packings 36, 38 of the type with generally annularly shaped elastomeric bodies or cores that are radially extensible when externally clamped along longitudinal axes 42, 44 of the core. FIGS. 4 and 5 have generally a piston-type shape with one or more O-ring receiving circumferential grooves 46, 48, 50 formed in a surface portion of the core. An O-ring 52, 54, 56 is disposed in each of the grooves. The packing 36 of FIG. 4 has a cylindrical shape whereas the packing 38 of FIG. 5 has a frustoconical shape. However, both packings have a surface portion that is substantially circular 58 when viewed in axial cross section along the lines A—A or B—B as is illustrated by FIG. 6. Also as shown in FIG. 6, fiber 59 may be dispersed throughout the body or core to improve its compressive modulus for improved O-ring support.

In use, one or more of the annularly shaped elastomeric core type joint packings 36 with O-rings 52 such as shown in FIG. 4, are assembled as part of a clamping tool 60 as shown in FIG. 7. A "down-hole" portion 62 of the tool may have an annular flange 64 that abuts an end portion of one packing and an internal bore 66 which receives a collared piston 68 that engages an end portion of a second packing. A washer 70 may be disposed between the stacked packings. The tool is placed in a casing 72 where there is a clearance 74 between the packings and casing. Optionally a stop means may be included as part of the packer to control the amount of axial clamping which may take place. The stop means is in the form of sleeves 75 whose lengths are less than the longitudinal height of the packers. The length of the sleeves controls the amount of axial clamping.

As shown in FIG. 8, when the tool is activated, there is relative axial movement between the tool components and corresponding axial clamping of the packings causing them to radially extend 76 and engage 78 the well casing. The action of the radially extensible core circumferentially extends the elastomeric O-ring and places it in sealing engagement 80 against the casing. Differential pressure may then be applied above 82 and below 84 the O-rings causing them to make a typical O-ring seal. The differential pressure may also cause portions of the packing to distend 86.

The sleeves 75, as a stop means, come into contact with each other to preclude further axial clamping of the core or body. Such a limitation on clamping also limits the amount which the core or body may be radially distended. The stop means may optionally be used to prevent damage to the core as caused by too much clamping.

To illustrate the improvement which the O-ring assembly embodiment of the invention provides over similar prior art articles without an O-ring, the core of the configuration shown in FIG. 4 was constructed with a 4.45 inch outside diameter, a 2.75 inch inside diameter, a 2.86 inch axial length, and a stop means as a sleeve with an axial length of 1.950 inches. The body was reinforced with an embedded fiber glass fiber constituting about 11 percent by volume. An O-ring receiving groove 0.160 inches deep and 0.325 inches wide was formed in an exterior surface portion of the core. An O-ring with a 0.210 inch diameter cross section and a durometer of about 90 was disposed in the O-ring receiving groove. The so-constructed elastomeric bodies had compression modulus of about 1700 psi at 25 percent compression at 300° F. during their first compression cycle. The stop means limited the compression of the seals to about 32 percent. The packing was used with a clamping tool 60 to seal a cylindrical bore having a 4.95 inch diameter leaving a radial clearance K of 0.25 in. between the core and bore. The example packing of the invention effected a satisfactory seal repeatedly at pressures up to about 7500 psi with some seals exhibiting satisfactory sealing at pressures as high as 8500 psi at temperatures of 300° F. This is approximately a 100 percent improvement over known seals of the prior art where sealing pressures at about 3000 psi are realized.

The foregoing detailed description is made for purpose of illustration only and is not intended to limit the scope of the invention which is to be determined from the following claims.

What is claimed is:

1. In an O-ring assembly of the type for sealing a clearance between a piston-like member and cylindrical bore, the improvement comprising:
    a generally annularly shaped piston-like elastomeric body with a portion radially extensible when longitudinally clamped along a longitudinal axis of the body to contact a portion of the cylindrical bore to the extent that there is zero clearance between the body and bore, the body having an exterior surface portion that is substantially circular when viewed in axial cross section, and the body having a compression modulus and an O-ring receiving circumferential groove formed in said surface portion, the groove is circumferentially extensible and defines a means for supporting an O-ring at various diameters; and
    an elastomeric O-ring disposed in the groove and circumferentially extensible by the groove when a portion of the body is radially extended when the body is clamped to contact a portion of the cylindrical bore, the O-ring having a compression modulus less than the compression modulus of the body.

2. The O-ring assembly as claimed in claim 1 which further comprises fiber substantially dispersed throughout the body and defining a reinforcement.

3. The O-ring assembly as claimed in claim 1 which further includes a stop means for limiting how far the body may be axially clamped.

4. In a joint packing of the type with a generally annularly shaped elastomeric core that is radially extensible when externally clamped along a longitudinal axis of the core to have a portion thereof contact a portion of a cylindrical bore, the core having an axial length and the improvement in the core comprising:
    an exterior surface portion that is substantially circular when viewed in axial cross section, the core having an O-ring receiving circumferential groove formed in said surface portion, the groove is circumferentially extensible when the core is axially clamped and defines a means for supporting an O-ring against a portion of a cylindrical bore at various core diameters; and an elastomeric O-ring disposed in the groove and circumferentially extensible by the groove when the core is radially extended.

5. The joint packing as claimed in claim 4 which further includes a stop means for limiting how far the core may be axially clamped.

6. The joint packing as claimed in claim 5 wherein the step means is a sleeve coaxially aligned with and disposed radially inward of the annularly shaped elastomeric core, the sleeve having an axial length that is less than the axial length of the core.

7. A method for sealing between a cylindrical type bore and a piston-type member with an O-ring assembly comprising the steps of:

providing a radially extensible elastomeric body having an exterior surface portion that is substantially circular when viewed in axial cross section with an O-ring receiving, circumferential groove;

fitting an elastomeric O-ring in the groove; radially extending the body and contacting a portion of the bore while simultaneously circumferentially extending the groove and O-ring;

pressing the O-ring into sealing engagement with the cylindrical bore by means of the radially extensible elastomeric body whereby the generally piston-shaped elastomeric body provides the step of adjusting the O-ring assembly to accommodate various size cylindrical bores to the extent that there is zero clearance between the body and bore.

* * * * *